(12) United States Patent
Morcol et al.

(10) Patent No.: US 6,183,803 B1
(45) Date of Patent: Feb. 6, 2001

(54) METHOD FOR PROCESSING MILK

(75) Inventors: Tulin Morcol, Decatur; Steve J. D. Bell, Marietta, both of GA (US)

(73) Assignee: BioSante Pharmaceuticals, Inc., Smyrna, GA (US)

( * ) Notice: Under 35 U.S.C. 154(b), the term of this patent shall be extended for 0 days.

(21) Appl. No.: 09/329,855

(22) Filed: Jun. 11, 1999

(51) Int. Cl.$^7$ .................................................. A23J 1/20
(52) U.S. Cl. ........................ 426/580; 426/657; 530/361
(58) Field of Search ................................. 426/580, 588, 426/657; 530/360, 361, 402, 415, 365, 366; 800/4, 5

(56) References Cited

U.S. PATENT DOCUMENTS

| | | |
|---|---|---|
| 4,519,945 | 5/1985 | Ottenhof . |
| 4,873,316 | 10/1989 | Meade et al. . |
| 5,077,067 | 12/1991 | Thibault . |
| 5,173,322 | * 12/1992 | Melachouris et al. ............... 426/580 |
| 5,420,249 | * 5/1995 | de Wit et al. ........................ 530/366 |
| 5,431,725 | * 7/1995 | Matsumoto et al. .................... 106/38 |
| 5,462,751 | * 10/1995 | Kossovsky et al. .................. 424/494 |
| 5,565,362 | 10/1996 | Rosen . |
| 5,589,604 | 12/1996 | Drohan et al. . |
| 5,639,940 | 6/1997 | Garner et al. . |
| 5,880,327 | 3/1999 | Lubon et al. . |
| 5,905,185 | * 5/1999 | Garner et al. .......................... 800/14 |

OTHER PUBLICATIONS

Protein Purification: Principles and Practice, 199–208, (Scopes, R.K., ed., Springer–Verlag, New York, 1983).

Clark et al., "Expression of Human Anti–Hemophilic Factor IX in the Milk of Transgenic Sheep," *Bio/Technology* 7 (1989).

Denman et al., "Transgenic Expression of a Variant of Human Tissue–Type Plasminogen Activator in Goat Milk: Purification and Characterization of the Recombinant Enzyme," *Bio/Technology* 9:839–843 (1991).

DiTullio et al., "Production of Cystic Fibrosis Transmembrane Conductance Regulator in the Milk of Transgenic Mice," *Bio/Technology* 10:74–77 (1992).

Drohan et al., "A Scalable Method for the Purification of Recombinant Human Protein C from the Milk of Transgenic Swine," *Advances in Bioprocess Engineering* 501–507 (1994).

Ebert et al., "Transgenic Production of a Variant of Human Tissue–Type Plasminogen Activator in Goat Milk: Generation of Transgenic Goats and Analysis of Expression," *Bio/Technology* 9:853–838 (1991).

Gordon et al., "Production of Human Tissue Plasminogen Activator in Transgenic Mouse Milk," *Bio/Technology* 5:1183–1187 (1987).

Groves and Farrell, "Isolation and Characterization of New Proteins Produced by the Infusion of Colchicine in Goat Mammary Gland," *Biochim. Et. Biophsy. Acta* 844:105–112 (1985).

McKown and Teutonico, "Transgenic Animals for Production of Proteins," *Genetic Eng. News* 19, 9 (1999).

Morcol et al., "The Porcine Mammary Gland as a Bioreactor for Complex Proteins," *Annals New York Acad. Sci.* 721:218–233 (1994).

Owen and Andrews, "A Procedure for the Complete Clarification of Milk of Various Species and its Suitability for Use with Colorimetric Measurements," *J. Dairy Res.* 51:307–315 (1984).

Strijker et al., "Expression of Human Lactoferrin in Milk of Transgenic Animals," *Harnessing Biotechnology for the 21st Century*,38–41 (Ladish, M.R., and Bose, A., eds., 1992).

Velander et al., "Expression of Human Protein C in Transgenic Swine," *Harnessing Biotechnology for the 21st Century*, 34–37 (Ladisch, M.R. and Bose, A., eds., 1992).

Wilkins, "Purification of Proteins from Milk of Transgenic Animals," *J. Cellular Biochem.*, Supp. 17A–17B:39 (1993).

Wright et al., "High Level Expression of Active Human Alpha–1–Antitrypsin in the Milk of Transgenic Sheep," *Bio/Technology* 9:830–834 (1991).

* cited by examiner

*Primary Examiner*—Keith D. Hendricks
(74) *Attorney, Agent, or Firm*—Bruce D. Gray; Kristin D. Mallatt; Kilpatrick Stockton LLP

(57) ABSTRACT

The present invention relates to methods for separating casein from milk, and for separating from milk proteins that can be associated or entrained within casein micelles, by contacting the milk with a chelating agent to disrupt the casein micelles and reconstituting the micelles by introducing small insoluble inorganic particles.

42 Claims, 5 Drawing Sheets

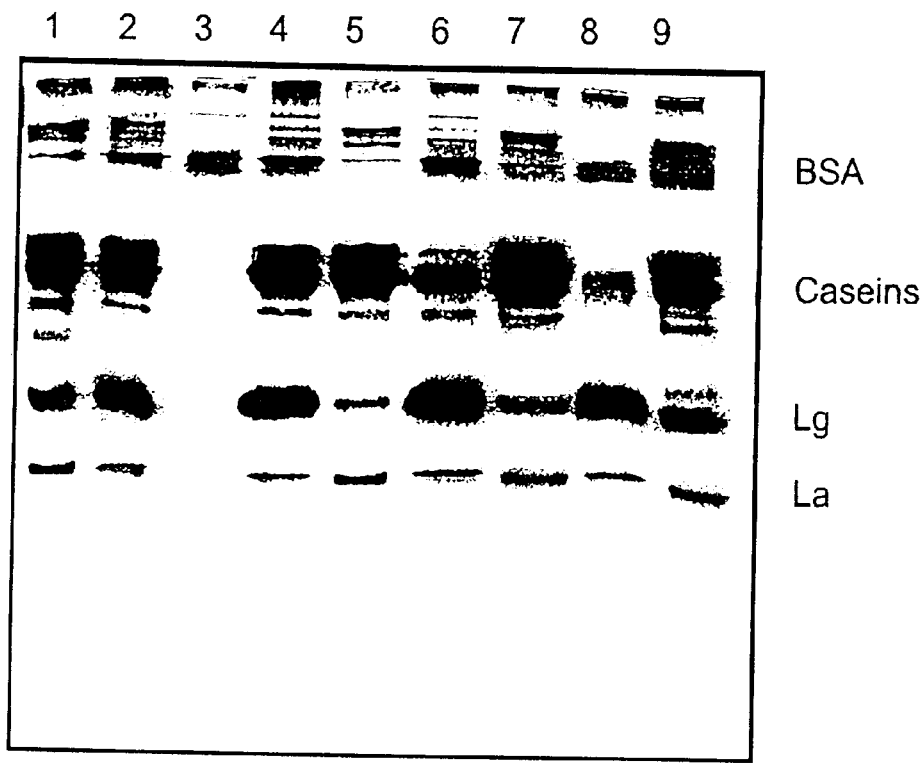

| Lane | Sample |
|---|---|
| 1 | EDTA-clarified control milk serum |
| 2 | EDTA-clarified milk serum containing BSA |
| 3 | BSA reference |
| 4 | CAP supernatant #1 (BSA-rich fraction): 12 mg CAP/ml milk |
| 5 | CAP precipitate #1 (casein-rich fraction): 12 mg CAP/ml milk |
| 6 | CAP supernatant #2 (BSA-rich fraction): 24 mg CAP/ml milk |
| 7 | CAP precipitate #2 (casein-rich fraction): 24 mg CAP/ml milk |
| 8 | CAP supernatant #3 (BSA-rich fraction): 48 mg CAP/ml milk |
| 9 | CAP precipitate #3 (casein-rich fraction): 48 mg CAP/ml milk |

15% SDS-PAGE and silver staining of fractions from CAP-processing of cow milk which was spiked with 1mg bovine serum albumin (BSA)/ml milk.

*Fig. 1*

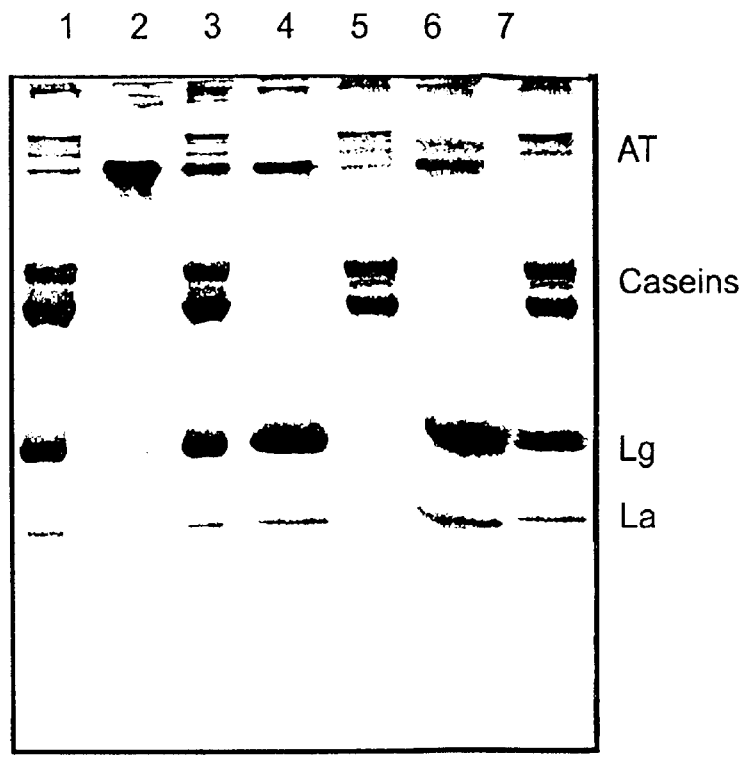

| Lane | Sample |
|---|---|
| 1 | EDTA-clairified control milk serum |
| 2 | α1-AT reference |
| 3 | EDTA-clarified milk serum containing α1-AT |
| 4 | CAP supernatant #1 (α1-AT-rich fraction): 30 mg CAP/ml milk |
| 5 | CAP precipitate #1 (casein-rich fraction ): 30 mg CAP/ml milk |
| 6 | CAP supernatant #2 (α1-AT-rich fraction ): 60 mg CAP/ml milk |
| 7 | CAP precipitate #2 (casein-rich fraction ): 60 mg CAP/ml milk |

15% SDS-PAGE and silver staining of fractions from CAP-processing of bovine milk which was spiked with 0.7 mg human α1-antitrypsin (α1-AT)/ml milk.

*Fig. 2*

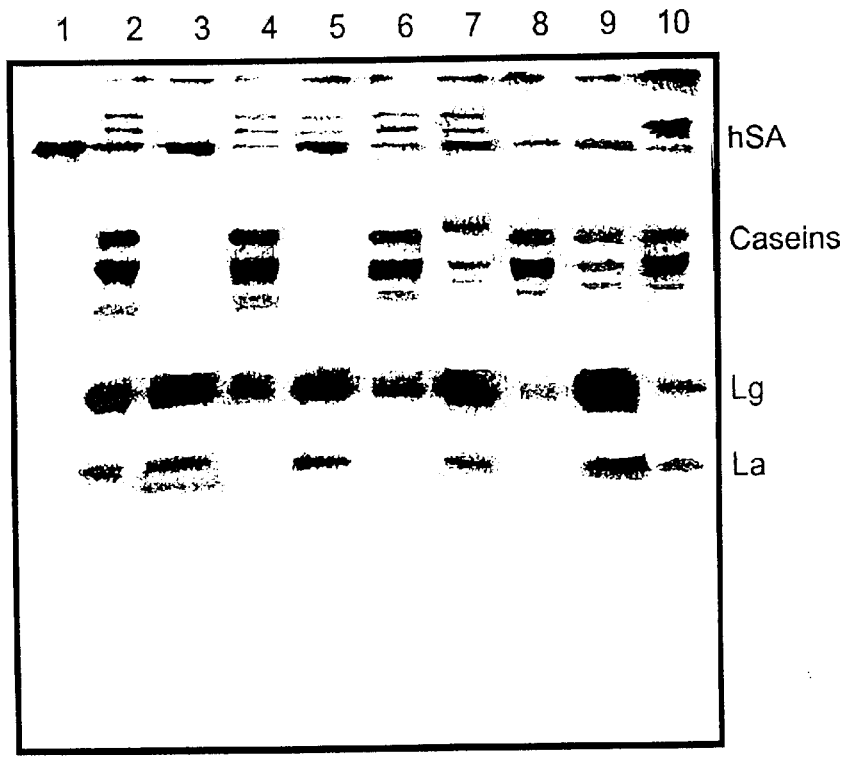

| Lane | Sample |
|---|---|
| 1 | hSA reference |
| 2 | Clarified milk serum containing hSA |
| 3 | CAP supernatant #1 (hSA-rich fraction) 30mg CAP/ml milk |
| 4 | CAP precipitate #1 (casein-rich fraction): 30 mg CAP/ml milk |
| 5 | CAP supernatant #2 (hSA-rich fraction): 60 mg CAP/ml milk |
| 6 | CAP precipitate #2 (casein-rich fraction): 60 mg CAP/ml milk |
| 7 | hSA-milk whey from HAc-precipitation (hSA-rich fraction): Conventional |
| 8 | Precipitate from HAc-precipitation (casein-rich fraction) |
| 9 | Control milk whey from HAc-precipitation |
| 10 | Control precipitate from HAc-precipitation |

15 % SDS-PAGE and silver staining of fractions from CAP-processing of bovine milk which was spiked with 0.7 mg human serum albumin (HSA)/ml milk.

*Fig. 3*

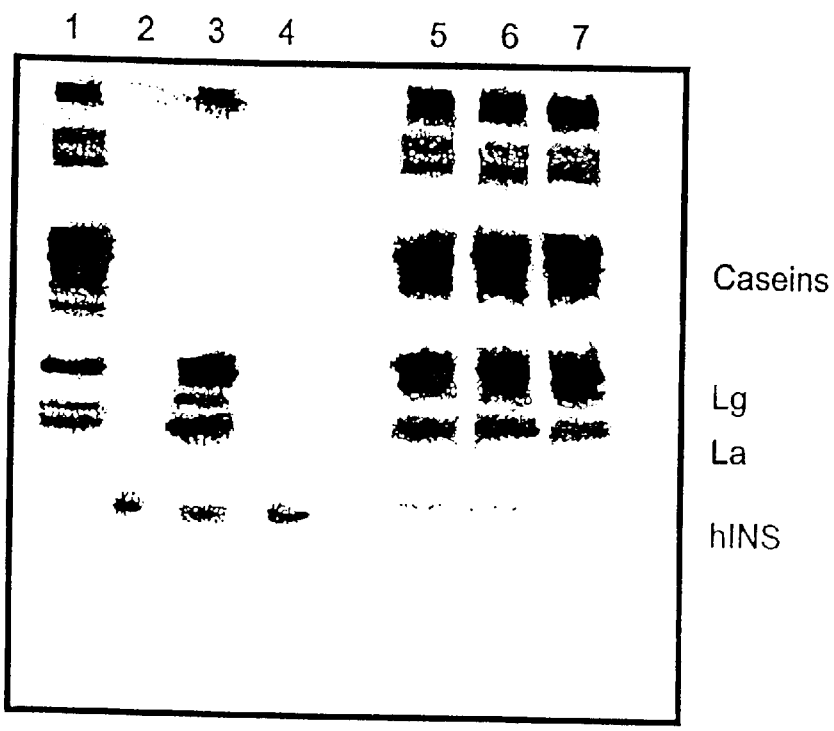

| Lane | Sample |
|---|---|
| 1 | CAP precipitate (casein-rich): 30 mg CAP/ml milk |
| 2 | hINS reference |
| 3 | CAP supernatant containing (HINS-rich): 30 mg CAP/ml milk |
| 4 | hINS reference |
| 5 | EDTA-clarified milk serum containing 1% hINS (after dialysys) |
| 6 | EDTA-clarified milk serum containing 0.97% hINS (before dialysis) |
| 7 | EDTA-clarified control milk serum |

15% SDS-PAGE and silver staining of fractions from CAP-processing of cow milk which was spiked with 0.25 mg human insulin (hINS)/ml milk.

*Fig. 4*

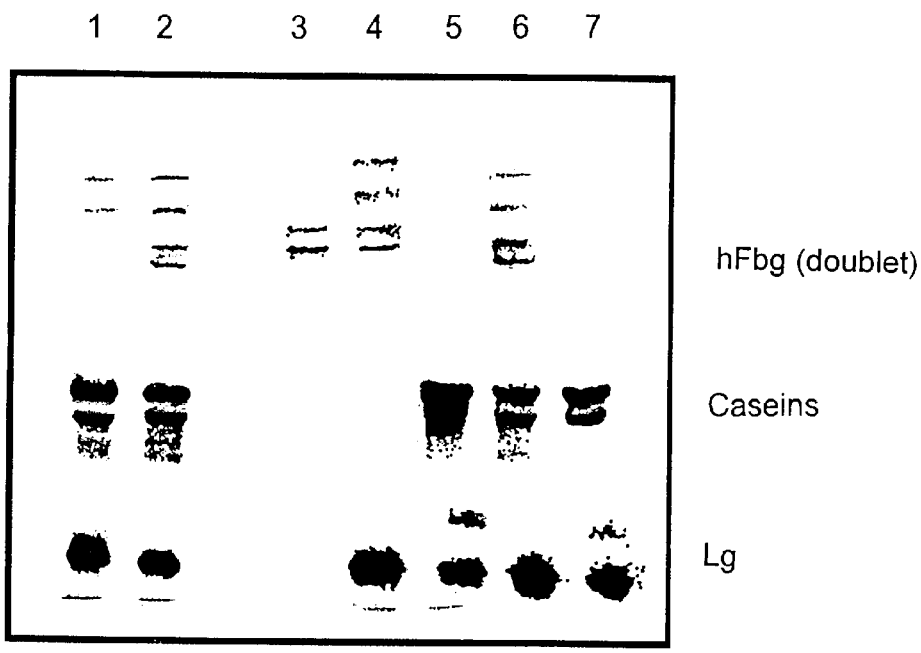

| Lane | Sample |
|---|---|
| 1 | EDTA-clarified control milk serum |
| 2 | EDTA-clarified milk serum containing 1.56%hFbg |
| 3 | hFbg Reference protein |
| 4 | CAP supernatant #1 (using wet CAP concentrate) (hFbg-rich fraction) |
| 5 | CAP precipitate #1 (casein-rich fraction) |
| 6 | CAP supernatant #2 (using lyophillized CAP) (hFbg-rich fraction) |
| 7 | CAP precipitate #2 (casein-rich fraction) |

10% Reduced-SDS-PAGE and silver staining of fractions from Example 5. Comparison of wet and lyophilized CAP particles in casein precipitation. Raw cow milk was spiked with 0.5 mg of type III human fibrinogen (hFbg) per ml milk (~1.56%w/w) and was treated either with 30 mg of lyophilized CAP or CAP concentrate with wet weight equivalend to 30 mg dry weight.

*Fig. 5*

METHOD FOR PROCESSING MILK

FIELD OF THE INVENTION

The invention relates to a method of processing milk involving forming a solid phase containing reformed casein micelles and a liquid phase that is substantially free of caseins and casein micelles. The invention also relates to isolating a biologically active target material, such as a recombinant protein, from milk without significant loss in yield. The present invention can be used, among other things, to prepare food products, including baby formula and fat substitutes.

BACKGROUND OF THE INVENTION

Recombinant DNA technology permits the introduction of a heterologous gene or cDNA into a host cell genome. The heterologous gene is transcribed and translated by the host cell machinery, providing an expression system for production of heterologous protein. Various host cells are used for this purpose, including bacteria, yeast, and cultured insect and mammalian cells.

The choice of an expression system is governed by the characteristics of the heterologous protein and the particular production demands. Bacterial expression systems produce high concentrations of recombinant proteins, but fail to provide processing (i.e., proper folding and post-translational modification) necessary to the impart biological activity to many eukaryotic recombinant proteins. Cultured eukaryotic cells provide the proper processing to ensure production of proteins in their native form, but fail to produce them in high concentrations. Instead, cultured eukaryotic systems generally produce only very low concentrations of recombinant protein at a prohibitive cost. U.S. Pat. No. 4,873,316.

In recent years, transgenic animals have been recognized to provide an advantageous alternative to traditional cell culture expression systems, serving as living bioreactors for the production of recombinant protein. Like bacterial expression systems, transgenic animals can produce high concentrations of recombinant product at a relatively low cost. Like eukaryotic expression systems, transgenic animals provide the processing needed to ensure biologically active recombinant eukaryotic proteins. The methods for producing transgenic animals include microinjection of the recombinant DNA construct into the original genome (U.S. Pat. Nos. 5,880,327 and 5,639,940) and, more recently, cloning technologies (*Transgenic Animals For Production of Proteins*, Genetic Eng. News, May 1999). The offspring of these transgenic animals inherit the transgene in normal Mendelian fashion.

Expression of recombinant proteins can be targeted to a particular tissue, such as the mammary gland. U.S. Pat. Nos. 5,565,362 and 5,589,604. Mammary expression provides a highly efficient system for the synthesis and secretion of large quantities of recombinant proteins. Expression of numerous biologically active human proteins in transgenic milk has been reported, including human lactoferrin (Strijker et al., *Expression of Human Lactoferrin in Milk of Transgenic Animals*, in Harnessing Biotechnology for the 21st Century, 38–41 (Ladish, M. R. and Bose, A., eds., 1992), protein C (Morcol et al., The Porcine Mammary Gland as a Bioreactor for Complex Proteins, Annals New York Acad. Sci. 721, 218–233 (1994)), tissue-type plasminogen activator (tPA) (Ebert et al., (1991) Bio/Technology 9: 853–837); Gordon et al., (1987) Bio/Technology 5: 1183–1187); Denman et al., Bio/Technology 9: 839–843), and alpha-1-antitripsin ($\alpha$1-AT) (Wright et al., Bio/Technology 9: 830–834).

While showing great promise, production of recombinant protein in transgenic milk is presently limited by the difficulties involved in recovering the recombinant product. (Velander et al., *Expression of Human Protein C in Transgenic Swine*, in Harnessing Biotechnology for the 21t Century, 34–37 (Ladisch, M. R. and Bose, A., 1992). Milk is a complex secretion of well over 50 discrete proteins, some present in very high concentrations. The sheer quantity of protein naturally present in milk provides a significant obstacle to industrial-scale isolation of recombinant products and the required high degree of purity. Caseins are the most abundant of these milk proteins, accounting (in various forms) for over 50% of the protein in various animal milks (and about 70% of cow milk), and present in the tens of grams per liter. (Groves and Farrel, (1995) Biochim. Et. Biophys. Acta 844: 105–112). Bovine milk, for example, contains abut 10 g/l each of $\alpha$S1- and $\beta$-casein, and 3/gl each of $\alpha$S2- and k-casein. (Strijker et al.) Most of the caseins in milk aggregate with calcium in the form of colloidal micelles, ranging from about 0.1 to about 0.5 $\mu$m in diameter.

Known separating milk into three fractions (casein, whey and cream) using a combination of physical separation techniques (i.e., filtration and sedimentation), and/or acid precipitation. (U.S. Pat. No. 4,519,945); (Groves and Farrel); (Denman et al.). Conventional separation methods are undesirable, however, when used as the initial step in a method for isolating a target material from milk. More particularly, conventional methods produce very low yields, because much of the target material becomes entrapped in the casein precipitate fraction. Acid precipitation, moreover, produces a significant loss in biological activity of many target materials. The disadvantages of using conventional methods as the initial step in an isolation strategy is evident in reports of purification of recombinant tPA from transgenic goat milk (only 25% of overall yield, mostly due to a greater than 50% loss of activity during the initial acid precipitation step) (Denman et al.) and recombinant factor IX from transgenic ewe milk (2–2.5%) (Clark et al.(1989) Bio/Technology 9: 487–492). See alson Drahan et al., *A Scalable Method for the Purification of Recombinant Human Protein C from the Milk of Transgenic Swine*, in Advances in Bioprocess Engineering.

Known methods of casein removal are similarly disadvantageous in other industrial contexts. For example, casein micelles are commonly separated from milk to produce a whey fraction enriched in alpha-lactalbumin ($\alpha$-La), which is then used in the preparation of humanized milk products (e.g., baby formula). Yet, conventional casein removal methods produce an acidic pH in the starting whey fraction that undesirably lowers the $\alpha$-La to beta-lactoglobulin ($\beta$-Lg) ratio during the subsequent defiltration steps. U.S. Pat. No. 5,420,249. Casein micelles are also useful as fat substitutes, and commercially available caseins (e.g., acid caseins, alkali metal caseinates) are used for this purpose. U.S. Pat. No. 5,173,322. Yet, acid precipitation of milk destroys the micelle structure, so that commercially available caseins must be reconstructed as micelles to provide the desired fat substitute.

An important need remains, therefore, for a means of processing milk to produce a solid phase containing casein micelles, and a liquid phase that is substantially casein-free. More particularly, a need remains for an efficient means of isolating a biologically active target material from milk at high yields. The method of the present invention fully satisfies that need.

SUMMARY OF THE INVENTION

The present invention relates to a method of processing milk comprising casein micelles and whey proteins. The method involves an initial step wherein a chelating agent is added to the milk sample under conditions such that the casein micelles are wholly or partially deconstructed, forming a clarified milk serum containing caseins and whey proteins, but substantially no intact casein micelles. The clarified milk serum is then contacted with insoluble divalent cation salts, particularly calcium phosphate particles, under conditions such that at least some of the casein micelles reform as aggregates of casein around divalent cation cores. The reformed casein micelles precipitate forming a solid phase containing reformed casein micelles and a liquid phase containing whey proteins but substantially no caseins or casein micelles.

In one embodiment of the present invention, the milk contains a target material. According to the initial step of this embodiment, the milk is contacted a chelating agent such that at least a portion of the casein micelles are wholly or partially deconstructed Any target material entrapped within or otherwise associated with the casein micelle is released upon deconstruction, and the resulting preparation is a clarified milk serum containing casein, whey proteins and the target component, but substantially no intact casein micelles. Insoluble divalent cation salts are then introduced into the clarified milk serum causing the reformation of casein micelles as casein aggregates around insoluble divalent cores. The target material is not significantly recaptured within the reformed casein micelles. The reformed casein micelles precipitate to form a solid phase, leaving a liquid phase comprising the target material but substantially no caseins or casein micelles.

The initial step of the method of the present invention advantageously permits up to a 10-fold concentration of the target material with up to a 100% yield. The liquid phase produced by the initial step of the method can be further processed to isolate the target material.

The liquid phase produced by the initial step of the method is enriched in whey proteins, and can be further processed to provide a-La enriched-materials suitable for use in humanized milk products, such as baby formula. The method of the present invention advantageously eliminates the need to adjust pH to obtain a desirable α-La to β-Lg ratio in the liquid phase. The method of the present invention can also be used to produce purified α-La for a variety of uses, including as an anti-cancer agent.

The solid phase produced by the initial step of the present invention can also be further processed to provide materials suitable for use in food products, such as fat substitutes. The method of the present invention advantageously permits preparation of casein micelles as fat substitutes directly from raw milk, under conditions wherein the integrity of proteins present in the whey fraction is preserved.

DESCRIPTION OF THE FIGURES

FIG. 1 is a photograph of a silver stained 15% SDS-PAGE of fractions produced in Example 1. The figure depicts the extent of target component (BSA) concentration in the supernatant fraction (lanes 4, 6 and 8) achieved over a range of CAP concentrations utilized in the present invention.

FIG. 2 is a photograph of a silver-stained 15% SDS-PAGE of fractions produced in Example 2. The figure depicts the extent of target component (α1-AT) concentration in the supernatant fraction (lanes 4 and 6) achieved over a range of CAP concentrations utilized in the present invention.

FIG. 3 is a photograph of a silver stained 15% SDS-PAGE of fractions produced in Example 3. The figure depicts the extent of target component (hSA) concentration in the supernatant fraction (lanes 3 and 5) achieved according to the method of the present invention. Comparison with the concentration of hSA achieved by traditional acid precipitation methods is also provided (lanes 9 and 10).

FIG. 4 is a photograph of a silver stained 15% SDS-PAGE of fractions produced in Example 4. The figure depicts the extent of target component (hINS) concentration in the supernatant fraction (lane 3) using 30 mg CAP/ml of milk in the method of the present invention.

FIG. 5 is a photograph of a silver stained 10% SDS-PAGE of fractions from Example 5. The figure depicts the extent of target component (human fibrinogen) concentration in the supernatant achieved according to the present invention using wet (lane 4) vs. lyophilized (lane 6) CAP.

DETAILED DESCRIPTION OF SPECIFIC EMBODIMENTS OF THE INVENTION

The present invention relates to a method of processing milk comprising casein micelles and whey proteins. According to the initial step of this method, the milk is contacted with a chelating agent under conditions such that the casein micelles are wholly or partially deconstructed, forming a clarified milk serum comprising caseins, whey proteins, but substantially no intact casein micelles. Insoluble divalent cation salts are then added to the clarified milk serum under conditions such that at least some of the casein reform and precipitate, forming a solid phase containing the reformed casein micelles and a liquid phase containing the whey proteins but substantially no caseins or casein micelles.

Chelating agents suitable for use in the present invention include compounds which are capable of removing divalent cations from milk by complexing, and also to inhibit metalloproteinases which require divalent cations for activity. (Protein Purification: Principles and Practice, 199, (Scopes, R. K., ed., Springer-Verlag, N.Y., 1983). The chelating agent is believed to deconstruct the casein micelle by complexing the micelle's calcium core. Owen, A. J. and Andrews, A. T. (1984), J. Dairy Res. 51, 307–315. The chelating agent is prepared at neutral pH conditions. Examples of suitable chelating agents include, without limitation, ethylenediaminetetraacetic acid (EDTA), citrate buffer, histidine, ethylene glycol-bis-tetraacetic acid (EGTA), deferoxamine, pentetic acid.

The term "insoluble divalent cation salts" includes, without limitation, calcium and magnesium salts or particles. In a particular embodiment, the solubility of the divalent cation salts is less than about 0.1% in hot or cold water. Non-limiting examples of magnesium salts include magnesium carbonate and magnesium phosphate. Non-limiting examples of calcium salts include calcium phosphate, calcium carbonate, and calcium citrate. Calcium phosphate salts include brushite and hydroxyaptite-based calcium phosphate particles. Brushite and hydroxyappatite based particles include, but are not limited to, crystalline brushite particles as described in U.S. Pat. No. 5,462,751 and in provisional patent application Ser. No. 60/118356 the contents of each of which are incorporated by reference.

The term "insoluble divalent cation salt" is intended to include divalent cation-based crystals in lyophilized form or in aqueous suspension, which are stable within a slightly acidic to slightly basic pH range (about pH 5.5-8).

The reformed casein micelle comprises an aggregate of caseins associated with a insoluble divalent cation salt or particle core. The size of the reformed casein micelle primarily depends upon the size of the insoluble divalent cations salts or particles used as cores. The particles of the present invention may be nanoparticles, as described in U.S. Pat. No. 5,462,751 and in provisional patent application Ser. No. 60/118356, or microparticles. In a particular embodiment, the nanoparticles of the present invention range from about 200 to 400 nm, and the reformed casein micelles are in the nanometer size range. In a further embodiment, the microparticles of the present invention range from about 1 $\mu$m to 10 $\mu$m, and the reformed casein micelles are about.

In one embodiment of the present invention, milk is processed to permit isolation of a target material present therein, such as a recombinant protein. According to the initial step of this method, a milk comprising a target material is contacted with a chelating agent, producing a clarified milk serum comprising caseins, whey proteins, and the target material, but no casein micelles. Insoluble divalent cation salts are then introduced to reform the casein micelles as casein aggregates surrounding a divalent cation core. The reformed micelles precipitate, forming a solid phase and a liquid phase. The solid phase contains reformed casein micelles, whereas the liquid phase contains whey proteins (e.g., $\alpha$-La, $\beta$-Lg) and the target material. Substantially no casein or casein micelles are present in the liquid phase.

According to a particular embodiment of the present invention, the target material in milk is free or at least partially contained or entrapped within the casein micelle. DiTullio, P. et al. (1992), Bio/Technology 10, 74–77; Wilkins, T. (1993), J. Cellular Biochem. Supplement 17A, 39. It is believed that disruption of the casein micelle by the chelating agent also disrupts protein:protein interactions (e.g., by altering protein conformation and electrostatic bond interactions), freeing any target material complexed with casein or physically trapped within the micelle structure. Electrostatic binding sites on casein molecules are preferentially saturated with divalent cations. This released target material is not recaptured within the reformed micelle. Precipitation of the reformed micelles leaves a liquid phase comprising the target material, which liquid phase is substantially casein-free.

The target material can then be isolated from the liquid phase. The order and type of subsequent process steps used to purify the target material will depend primarily on the physiochemical properties of the target material, as well as on cost. These processes may include, without limitation, ultrafiltration and/or diafiltration, ion exchange chromatography (including high performance liquid chromatography, HPLC), and/or affinity or pseudoaffinity chromatography techniques. Ultrafiltration and difiltration are particularly suitable for further processing of the casein-free starting material prepared according to the examples below.

A variety of target materials can be isolated from milk using the method of the present invention. Target materials include both materials normally present in milk, as well as materials not normally present in milk, but instead present in the milk of a transgenic animal. Target materials include proteins and glycoproteins naturally present in milk, such as $\alpha$-La and $\beta$-Lg, as well as recombinant proteins and glycoproteins present in transgenic milk. Recombinant proteins may be produced in native form, in whole or part, or as fused or stabilized proteins.

Recombinant proteins produced in transgenic milk may include therapeutic agents, i.e., proteins intended to have a therapeutic effect on a mammal when administered through an appropriate route at an appropriate dose. Examples of recombinant proteins which may be produced in transgenic milk include, but are not limited to, factors VIII and IX, protein C, prothrombin, tissue plasminogen activator (tPA), alpha-1-antitrypsin ($\alpha$1-AT), fibrin, fibrinogen, human or animal serum albumin, alpha-lactalbumin, immunoglobulins (antibodies), hemoglobin, cell surface antigens, antiviral proteins, insulin, interferon, interleukins, peptide hormones.

The biological activity of the target material is substantially preserved using the present method. Acidic or extreme basic pH, conformational changes in the target protein, and a corresponding loss of biological activity are avoided. Slight modifications of the pH may be desirable in view of a particular target protein's characteristics. The pH of the milk is preferably around neutral pH (6.5–7.0). In a particular embodiment of the present invention, the pH is between about 6.5 and about 6.8.

The present invention also permits recovery of non-protein target materials from milk, such as milk sugar (lactose) and vitamins (e.g., riboflavin, B2) from a casein-free starting material. Other materials recoverable from milk include, without limitation, haptens, antibiotics and drug molecules. Recovery or isolation methods include, without limitation, ultrafiltration or diafiltration, gel permeation chromatography, affinity chromatography, HPLC or reverse-phase HPLC.

The transgenic milk processed by the present invention is produced by non-human transgenic animals. Transgenic animals are defined as those that possess heterologous genetic information, directly or indirectly, by deliberate genetic manipulation at the subcellular level. As a result of this genetic manipulation, transgenic animals produce heterologous proteins or other materials not normally produced and secreted in milk. Transgenic animals include somatic and germ line transgenic animals. Techniques for introducing heterologous DNA into mammalian fertilized ova are well known in the art. The method developed here is typically intended to isolate large quantities of a target material, so mammals are typically selected according to the quantity of milk produced. Thus, large transgenic animals, such as cows, sheep, goats and pigs, are particularly suitable for producing the transgenic milk processed by the method of the present invention.

According to another embodiment of the present invention, bovine or ruminant milk is processed to produce humanized milk products (i.e., lacking beta-lactoglobulin), including baby formula. During the initial step of this method, milk is contacted with a chelating agent, causing deconstruction of the casein micelles. The resulting preparation is a clarified milk serum comprising caseins and whey proteins, but substantially no intact casein micelles. Insoluble divalent cation salts are then introduced to provide cores for reformation of the casein micelles. The reformed casein micelles precipitate from the clarified milk serum, forming a solid phase comprising reformed casein micelles and a liquid phase that is enriched in whey proteins ($\alpha$-La and $\beta$-Lg) but substantially free from caseins and casein micelles.

The liquid phase containing whey proteins can then be further processed to eliminate $\beta$-Lg using various techniques, including heat denaturation and pH adjustments (U.S. Pat. No. 5,420,249) and ion exchange chromatography (U.S. Pat. No. 5,077,067). In general, the goal is to eliminate as much $\beta$-Lg as possible. In a particular embodiment of the present invention, the $\alpha$-La to $\beta$-Lg ratio is between 0.1 and 1.0. The result of removing β-Lg from the whey fraction is to produce an α-La enriched whey fraction than can be further processed for use in baby formulas and other humanized milk products according to known methods.

In a particular embodiment of the present invention, α-La can be isolated or purified from the α-La-enriched whey fraction according to techniques familiar to those skilled in the art. The purified α-LA can be used for a variety of purposes, including as an anti-cancer agent.

According to a further embodiment of the present invention, milk is processed to produce casein micelles suitable for use as fat replacements. The solid phase is then separated from the liquid phase by centrifugation, and processed for use as a fat substitute according to known techniques, as described in U.S. Pat. No. 5,173,322.

According to another embodiment of the present invention, casein micelles are reformed from a processed casein material having substantially no casein in micelle form (e.g., acid caseins, alkali metal caseinates). The processed casein material is suspended in an aqueous solution, and the pH of the casein solution is maintained within the neutral range. In a particular embodiment, the pH is maintained in from about 6.3 to about 6.8. The aqueous solution of processed casein material is then contacted with insoluble divalent cation salts, which provide cores for the reconstruction of casein micelles. The reconstructed micelles can be further processed to produce fat substitutes as described in U.S. Pat. No. 5,173,322.

The size of the reformed casein micelles is primarily determined by the size of the particles used as cores. Size can be determined using photon correlation spectroscopy. In a particular embodiment, the particles are nanoparticles and the reconstructed casein micelles are in the microparticle size range. In another embodiment of the present invention, the particles are microparticles and the reconstructed casein micelles range from in the nanometer size range in diameter. Both the smaller (300–500 nm) and larger micelles (3–6 mm) can be processed to produce fat substitutes as described in U.S. Pat. No. 5,173, 322.

Alternatively, the larger micelles can be further processed to obtain smaller structures. For example, the micelles are dispersed in a suitable buffer, or water, and then sonicated to produce smaller micelles. These smaller micelles can be processed further to produce fat substitutes.

The present invention is further illustrated by the following examples which in no way should be considered as limiting of the scope of the invention. More particularly, the use of a spiked-milked model to demonstrate isolation of a target material should in no way be considered to limit the present invention to the isolation of externally added components.

EXAMPLE 1
Isolation of BSA from BSA-Spiked Bovine Milk

Preparation of Calcium Phosphate Particles. 800 mL of a 12.5 mM solution of calcium chloride and 200 mL of a 15 mM solution of sodium citrate were combined with constant mixing at room temperature. One liter of 12.5 mM dibasic sodium phosphate was then added to the mixture under constituent mixing. The immediate appearance of turbidity in the reaction flask indicated the formation of calcium phosphate crystals. Mixing was continued for about 48 hours. Particles were allowed to settle at the bottom of the container, then as much liquid (spent buffer) as possible was siphoned from the container. The remaining suspension was further concentrated by centrifugation at 4000× g for 15 minutes. The resulting particle pellet was suspended in 20 mL of spent buffer and stored at room temperature. The pH of the suspension was between 6.4–6.6. Particles prepared by this method ranged from 2–6 μm, as determined by photon correlation spectroscopy.

Spiking of Raw Milk with Target Component. A 10 mg/ml BSA stock solution was prepared in phosphate-buffered saline (PBS) containing 10 mM of sodium phosphate and 60 mM NaCl at pH 7.2. Approximately 25 ml of frozen raw milk (pH 6.7) was thawed at 37° C. and spiked with the BSA solution to a final concentration of 1 mg/nil BSA. (Although the cow milk contains a small amount of serum albumin (less than 1%) naturally, additionally exogenous BSA was added to develop and possibly optimize process parameters.) BSA-spiked milk was incubated for 2 hours at room temperature by gentle mixing on a rocking platform to allowed integration of BSA with the rest of the milk components.

The BSA-spiked milk was centrifuged at 7000× g for 15 minutes at 4° C. to separate the cream from the milk. The cream layer was punctured using a sharp pipette tip and skim milk was siphoned off.

Deconstruction of the Casein Micelles by Chelation. The skim milk was diluted with an equal volume of 250 mM EDTA, pH 7.2, which resulted in the formation of a clarified milk serum with a pH value of 6.8. The mixture was rotated for about 15 minutes to allow adequate chelation of calcium from milk and caseins.

To remove the EDTA, the clarified milk serum was dialyzed in a 12,000–14,000 molecular weight cutoff dialysis bag overnight at 5–10° C. against 2 liters of PBS. Dialysate was replaced with fresh buffer four times during this period. Three 1 mL fractions of the dialyzed milk serum were transferred into labeled 1.5 ml polypropylene centrifuge tubes. The remaining serum was stored frozen for future use.

Reconstruction of Casein Micelles by Addition of Calcium Phosphate Particles. One hundred μl of the CAP concentrate prepared above was added slowly into tube #1, 200 μl into tube #2, and 4001 μl into tube #3. Precipitation was immediately observed, indicating reformation of the casein micelles. The precipitate was separated by centrifugation at 4000× g for 15 minutes at 4° C. The supernatant was transferred into clean tubes and the pellet was solubilized with 100 mM EDTA.

Quantitative Analysis. The fractions obtained were then analyzed for total protein concentration using the Bradford's method and Bio-Rad's assay kit. Then, 2–3 μg of each fraction were separated on a 15% polyacrylamide SDS-PAGE and silver stained using a commercial kit from Sigma. The results are shown in FIG. 1 illustrate and compare the effect of increasing CAP concentration on casein removal and BSA concentration and recovery. As shown in lanes 4 and 5, treatment of EDTA clarified serum with 12 mg of CAP/ml milk was not adequate for removal of caseins originally present in the starting material. Although seemingly all of the spiked-BSA was recovered in the supernatant fraction, there were still considerable amount of casein present. Doubling the amount of CAP resulted in a decrease in the amount of casein present in the BSA-rich supernatant fraction (compare lane 4 to lane 6), although significant amounts of caseins remained, the majority believed to be β-casein. Increasing the CAP concentration to 48mg/ml milk (or 400μl concentrate) produced a dramatic decrease in the amounts of caseins present in the supernatant (compare lane 4 to lane 8), with almost 95% of caseins removed to the precipitate, with nearly all of the BSA concentrated in the supernatant fraction.

The data obtained by protein determination and silver stained SDS-PAGE suggested that 400 μl CAP concentrate/ml is the optimum working concentration in this example.

EXAMPLE 2
Isolation of α1-AT from α1-AT-Spiked Bovine Milk

Spiking of the Raw Milk With Target Component. A 2 mg/ml stock solution of α1-AT was prepared in PBS. The room temperature milk sample (pH 6.7) was aliquoted into two 0.2 ml fractions in 1.5 ml polypropylene tubes. One hundred μl of α1-AT stock solution was added to each tube to a final α1-AT concentration of 0.7 mg/ml, and then incubated for 2 hours by gentle mixing on a rocking platform to allow integration of α1-AT with natural milk components and allow formation of protein-protein complexes to mimic transgenic milk conditions.

Spiked milk was centrifuged at 7000× g at 4° C. for 15 minutes to separate cream from milk. The resulting skim milk was siphoned off by inserting a needle through the cream layer.

Deconstruction of Casein Micelles by Chelation. Skim milk was mixed with an equal volume of 250 EDTA, pH 7.2. The mixture was rotated for about 15 minutes to allow as much Ca++ removal by EDTA as possible. EDTA treatment produced rapid clearing of the skim milk, to form a clarified milk serum. The pH of the clarified milk serum was around 6.8 and no further adjustment was made.

EDTA containing milk serum was then dialyzed against three changes of 1 liter PBS in 12,000–14,000 molecular cut off dialysis bags for 5 hours. The dialyzed mixture was transferred into 1.5 mL polypropylene centrifuge tubes and the volume recorded. A 50 μl sample was removed from each tube for quantitative analysis of protein concentration, SDS-PAGE, and capillary electrophoresis (CE).

Reconstruction of Casein Micelles by Addition of CAP. One hundred μl and 200 μl of CAP concentrate (prepared as indicated in Example 1) were added into each remaining EDTA-free milk serum. Protein precipitation was clearly visible by the formation of a thick white layer, indicating reformation of the casein micelles.

Tubes containing precipitate were placed in the refrigerator for an hour and then centrifuged at 4000× g for 15 minutes at 4° C. The clear supernatant was transferred into clean tubes and the pellet solubilized using a mixture of 100 mM EDTA and 100 mM sodium citrate at 1:1 volume ratio.

Quantitative Analysis. Protein determination, SDS-PAGE and CE analysis were then performed as in Example 1. The results of SDS-PAGE are shown in FIG. 2, which demonstrates concentration of α1-AT in the supernatant fraction.

Table 1 illustrates the fold concentration/ purification and yield based on total protein determination, SDS-PAGE, and CE analyses of each fraction. α1-AT is shown to be concentrated 5–7 fold, over increasing concentrations of CAP, with a 100% yield, by the complete removal of caseins with calciumphosphate particles.

TABLE I

Human alpha-1-antitrypsin (AT) purification table

| Step | Total Protein (mg)* | AT (mg)* | % AT (area)** | % Casein (area)** | % Lg (area)** | Fold AT Purification | % AT Yield |
|---|---|---|---|---|---|---|---|
| 1. Whole milk | 7 | 0.2 | 3 | 65–70 | 20–25 | 1 | 100 |
| 2. EDTA-clarified skim milk serum | 3.5 | n.d. | 6 | 70 | 21 | 2 | 100 |
| 3a. CAP-supernatant (30 mg/ml milk) | 1.6 | n.d. | 14 | 0 | 78 | 5 | 100 |
| 3b. CAP-supernatant (60 mg/ml milk) | 1.0 | n.d. | 20 | 0 | 78 | 7 | 100 |

EXAMPLE 3
Isolation of hSA from hSA-Spiked Bovine Milk

The procedure described in Example 2 was followed, except that human serum albumin was substituted for α1-AT. The results of SDS-PAGE are shown in FIG. 3, which demonstrates the concentration of hSA in the supernatant. Table II illustrates the fold purification and product yield, based on the total protein determination, SDS-PAGE, and CE analyses of each fraction. hSA is shown to be concentrated 5-fold, with a 100% yield.

TABLE II

Human serum albumin (hSA) purification table

| Step | Total Protein (mg)* | hSA (mg)* | % hSA (area)** | % Casein (area)** | % Lg (area)** | Fold hSA Purification | % hSA Yield |
|---|---|---|---|---|---|---|---|
| 1. Whole cow milk | 7 | 0.2 | 3 | 65–70 | 20–25 | 1 | 100 |
| 2. EDTA-clarified skim milk serum | 3.4 | n.d. | 6 | 67 | 24 | 2 | 100 |
| 3a. CAP-supernatant (30 mg/ml milk) | 1.4 | n.d. | 14 | 0 | 80 | 5 | 100 |
| 3b. CAP-supernatant (60 mg/ml milk) | 1.5 | n.d. | 15 | 0 | 80 | 5 | 100 |

*Determined from Bradford's protein assay and gravimetric analysis.
**Indirect estimation as determined from ratios of peak areas obtained from capillary electrophoresis.

Comparison of Target Component Concentration by Traditional Acid Precipitation. Caseins in the hsA-spiked milk were also precipitated by traditional acid precipitation protocols (Penman et al). Caseins precipitated with acetic acid (Hack) were solublized with EDTA, pH of the supernatant (approximately 4.7) containing hSA and milk-whey proteins was adjusted to 6.8–7.0. The results are shown in FIG. 3, lanes 7 and 8. A close comparison of protein bands in each fraction (and also CE analysis) indicates that while no casein was left in the CAP-supernatant (lanes 3 and 5), acid precipitation did not remove all the caseins and about 15–12% was present in the hSA-rich supernatant/whey fraction, as estimated by comparison of the silver-stained protein band intensities.

EXAMPLE 4
Isolation of hINS from hINS-Spiked Milk

Spiking of Milk with Target Component. A human insulin (hINS) solution of 10 mg/ml was prepared in 0.01 N HCL according to the supplier's (Sigma) instructions. A 50 µl fraction was then added to 1 ml raw cow milk, to a final concentration of 0.25 mg/nil of raw milk.

Deconstruction of Casein Micelles by Chelation. The spiked milk was then clarified with EDTA, and subsequently dialyzed according the procedure set forth in Example 2.

Reconstruction of the Casein Micelles by Addition of CAP. 400 µL of CAP (equivalent to about 24 mg solid), as prepared in Example 1, was added to the clarified milk serum. The supernatant and precipitate fractions were separated by centrifugation as in Example 2.

Quantitative Analysis. All fractions were analyzed for total protein concentration, by SDS-PAGE and by CE, as in Example 1. The results of SDS-PAGE analysis are shown in FIG. 4. Table m summarizes the fold purification and product yield. Insulin was shown to be concentrated approximately 15 fold, with about 100% yield. No detectable casein was present in that insulin rich fraction.

TABLE III

Human insulin (hINS) purification from hINS-spiked cow milk

| Step | Total Protein (mg) | hINS (mg) | % hINS (area)[1] | % Casein (area)[1] | % Lg (area)[1] | Purification (fold)[2] | % hINS Yield |
|---|---|---|---|---|---|---|---|
| 1. Whole milk[3] | 33 | 0.25 | 0.75 | 65–70 | 20–25 | 1 | 100 |
| 2. EDTA-clarified skim milk serum | 22 | n.d. | 2.5 | 68 | 23 | 3 | 100 |
| 3. CAP-supernatant (hINS-rich) | 2.2 | n.d. | 11 | 0 | 83 | 15 | 100 |

[1]Area percentages were calculated from electrophoregrams from CE analysis.
[2]Fold purification was calculated from the ratios of "% hINS peak area/ 0.75"
[3]hINS concentration is calculated from the amount of added insulin and other milk protein concentrations are from published reports (Groves and Farrel). Percentage of hINS in the whole milk was 0.75% of total milk proteins (i.e. [0.75/33] × 100).

EXAMPLE 5
Isolation of hFbg from hFbg-Spiked Bovine Milk and Comparison of Reconstruction Efficacy of Wet vs. Lyophilized CAP Spiking of Milk With Target Component. A human fibrinogen (hFbg) stock solution of 10 mg/ml was prepared in PBS and 100 µl aliquots were added into two separate tubes containing 1 ml raw cow milk each, to a total concentration of 0.5 mg hFbg/ml raw milk.

Deconstruction of Casein Micelles by Chelation. The hFbg-spiked milk was then clarified with EDTA and dialyzed according to the procedure outlined in Example 2.

Reconstruction of Casein Micelles by Addition of CAP. 325 µg (wet weight) of CAP particle precipitate (equivalent to about 30 mg solid) was added to one tube, while 30 mg lyophilized CAP crystals were added to the second tube. Supernatant and precipitate fractions were separated by centrifugation as in Example 2.

Quantitative Analysis. All of the fractions were analyzed for total protein concentration, by SDS-PAGE (10%) and CE, as in Example 1. FIG. 5 depicts the results, indicating that both wet and lyophilized preparations were able to concentrate hFbg in supernatant fractions with apparent 100% yield (Lanes 4 and 6), as estimated visually from the silver-stained protein band intensities, and no significant casein contamination was observed in the hFbg supernatant fractions precipitated by wet CAP (lane 4). On the other hand, approximately 40% of the total protein in the supernatant fraction generated by lyophilized CAP contained caseins as one of the major contaminants (lane 6). Wet particles were shown to be more efficient in precipitating, caseins, by comparison of band intensities.

The present invention having been thus described, various modifications and variations thereof as would be apparent to those of skill in the art are included within the scope of the invention

What is claimed is:

1. A method of processing a milk comprising casein micelles and whey proteins, comprising:
   contacting the milk with a chelating agent under conditions sufficient to cause the casein micelles to be wholly or partially deconstructed, forming a clarified milk serum comprising caseins and whey proteins, but reduced levels of intact casein micelles;
   contacting the clarified milk serum with insoluble divalent cation salts under conditions sufficient to cause at least some of the casein micelles to reform and precipitate, forming a solid phase containing reformed casein micelles and a liquid phase containing whey proteins, wherein substantially no casein or casein micelles are present in the liquid phase;
   separating the solid phase from the liquid phase.

2. The method of claim 1, wherein the pH of the liquid phase is in the range of of about 6.5 to about 7.0.

3. The method of claim 1, wherein the milk further comprises a target material, and wherein said target material obtained in the liquid phase.

4. The method of claim 3, wherein the target material in milk is at least partially contained within the casein micelles and wherein this contained target material is released when the casein micelles are wholly or partially deconstructed and is not recaptured within the reformed casein micelles.

5. The method of claim 3, wherein the target material is a protein.

6. The method of claim 5, wherein the protein is naturally present in milk.

7. The method of claim 6, wherein the protein is alpha-lactalbumin.

8. The method of claim 5, wherein the protein is a recombinant protein.

9. The method of claim 8, wherein the recombinant protein is a therapeutic agent.

10. The method of claim 9, wherein the therapeutic agent is human serum albumin, α1-antitripsin, insulin or fibrinogin.

11. The method of claim 3, wherein the target material is not a protein.

12. The method of claim 3, further comprising isolating the target material from the liquid phase.

13. The method of claim 12, wherein the loss of the target material is less than about 10%.

14. The method of claim 12, wherein the loss of the target material is less than about 5%.

15. The method of claim 1, further comprising processing the solid phase for use as fat substitute.

16. The method of claim 1, wherein the whey proteins comprise alpha-lactalbumin and beta-lactoglobulin.

17. The method of claim 16, further comprising removing beta-lactoglobulin from the liquid phase, forming an alpha-lactalbumin-enriched whey fraction.

18. The method of claim 17, further comprising processing the alpha-lactalbumin-enriched whey fraction for use in humanized milk products.

19. The method of claim 18, wherein the humanized milk product is a composition of non-allergenic baby formula.

20. The method of claim 17, further comprising isolating alpha-lactalbumin from the alpha-lactalbumin-enriched whey fraction.

21. The method of claim 20, wherein the isolated alpha-lactalbumin is further used in a cancer treatment.

22. The method of claim 1, wherein the solubility of the insoluble divalent cation salts is less than about 0.1% in hot or cold water.

23. The method claim 1, wherein the insoluble divalent cation salts are selected from the group consisting of insoluble calcium and magnesium salts.

24. The method of claim 23, wherein the insoluble calcium salts are selected from the group consisting of calcium phosphate and calcium carbonate.

25. The method of claim 24, wherein the calcium phosphate salts are biodegradable brushite or hydroxyapatite-based particles.

26. The method claim 23, wherein the insoluble magnesium salts are selected from the group consisting of magnesium carbonate and magnesium phosphate.

27. The method of claim 1, wherein the insoluble divalent cation salts are microparticles ranging from 1 μm to 10 μm in diameter.

28. The method of claim 1, wherein the insoluble divalent cation salts are nanoparticles ranging from 200 to 400 nm in diameter.

29. A method of producing reformed casein micelles from milk, comprising:

providing an aqueous solution comprising processed casein material having substantially no casein in micelle form, contacting said aqueous solution with insoluble divalent cation salts under conditions sufficient to cause at least some reformed casein micelles to be produced.

30. The method of claim 29, wherein the processed casein material is selected from the group consisting of acid caseins and alkali metal caseinates.

31. The method of claim 29, wherein the pH of the aqueous solution is in the range of about 6.5 to 7.0.

32. The method of claim 31, wherein the pH of the aqueous solution is in the range of about 6.5 to 6.8.

33. The method of claim 29, wherein the solubility of the insoluble divalent cation salts is less Man about 0.1% in hot or cold water.

34. The method claim 29, wherein the insoluble divalent cation salts are selected from the group consisting of insoluble calcium and magnesium salts.

35. The method of claim 34, wherein the insoluble calcium salts are selected from the group consisting of calcium phosphate, calcium carbonate and calcium citrate.

36. The method of claim 35, wherein the calcium phosphate salts are biodegradable brushite or hydroxyapatite-based particles.

37. The method claim 34, wherein the insoluble magnesium salts are selected from the group consisting of magnesium carbonate and magnesium phosphate.

38. The method of claim 29, wherein the insoluble divalent cation salts are microparticles ranging from 1 μm to 10 μm in diameter.

39. The method of claim 29, wherein the insoluble divalent cation salts are nanoparticles ranging from 200 to 400 nm in diameter.

40. The method of claim 29, further comprising processing said reformed casein micelles for use as fat substitute.

41. The method of claim 23, wherein the insoluble divalent cation salt is a calcium salt.

42. The method of claim 34, wherein the insoluble divalent cation salt is a calcium salt.

\* \* \* \* \*

UNITED STATES PATENT AND TRADEMARK OFFICE
CERTIFICATE OF CORRECTION

PATENT NO. : 6,183,803 B1
DATED : February 6, 2001
INVENTOR(S) : Morcol et al.

It is certified that error appears in the above-identified patent and that said Letters Patent is hereby corrected as shown below:

Column 2,
Line 18, delete "abut" and insert -- about --

Column 4,
Line 56, delete "hydroxyaptite" and insert -- hydroxyapatite --
Line 57, delete "hydroxyappatite" and insert -- hydroxyapatite --
Line 67, delete "a" and insert -- an --

Column 5,
Line 52, delete "difiltration" and insert -- diafiltration --

Column 8,
Lines 10, 19, and 30, delete "." after "C"
Line 16, delete "allowed" and insert -- allow --
Line 39, delete "4001" and insert -- 400 --

Column 9,
Line 17, delete "." after "C"

Column 11,
Line 24, delete "Table m" and insert -- Table III --

Column 12, claim 3,
Line 40, insert the term -- is -- between "material" and "obtained."

Column 13, claim 23,
Line 21, insert -- of -- after "method"

Column 13, claim 26,
Line 30, insert -- of -- after "method"

Column 14, claim 33,
Line 14, delete "Man" and insert -- than --

Column 14, claim 34,
Line 16, insert -- of -- after "method"

UNITED STATES PATENT AND TRADEMARK OFFICE
CERTIFICATE OF CORRECTION

PATENT NO. : 6,183,803 B1
DATED : February 6, 2001
INVENTOR(S) : Morcol et al.

It is certified that error appears in the above-identified patent and that said Letters Patent is hereby corrected as shown below:

Column 14, claim 37,
Line 25, insert -- of -- after "method"

Signed and Sealed this

Fifteenth Day of January, 2002

Attest:

*Attesting Officer*

JAMES E. ROGAN
*Director of the United States Patent and Trademark Office*